(12) United States Patent
Suzuki et al.

(10) Patent No.: US 9,391,910 B2
(45) Date of Patent: Jul. 12, 2016

(54) SMART PAUSE FOR DISTRIBUTED SWITCH FABRIC SYSTEM

(75) Inventors: Hiroshi Suzuki, Palo Alto, CA (US); Rong Pan, Sunnyvale, CA (US); Flavio Bonomi, Palo Alto, CA (US); Ravi Prasad, Fremont, CA (US); Padma Akkiraju, Fremont, CA (US); Hariprasada R. Ginjpalli, Cupertino, CA (US); Andrew Robbins, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 13/554,697

(22) Filed: Jul. 20, 2012

(65) Prior Publication Data

US 2014/0022901 A1    Jan. 23, 2014

(51) Int. Cl.
*H04L 12/56* (2006.01)
*H04L 12/825* (2013.01)
*H04L 12/933* (2013.01)

(52) U.S. Cl.
CPC .............. *H04L 47/266* (2013.01); *H04L 49/15* (2013.01)

(58) Field of Classification Search
None
See application file for complete search history.

(56) References Cited

U.S. PATENT DOCUMENTS

| 6,405,258 | B1* | 6/2002 | Erimli et al. ................... 709/235 |
| 7,327,678 | B2 | 2/2008 | Hamzah et al. |
| 2003/0058802 | A1* | 3/2003 | Jones ...................... H04L 47/10 370/252 |
| 2004/0095882 | A1* | 5/2004 | Hamzah et al. ............... 370/229 |
| 2004/0136359 | A1* | 7/2004 | Ivancovsky et al. .......... 370/352 |
| 2005/0111361 | A1* | 5/2005 | Hosein .......................... 370/230 |
| 2006/0146875 | A1* | 7/2006 | Yang ............................. 370/468 |
| 2006/0171313 | A1* | 8/2006 | Shimonishi ................... 370/229 |
| 2007/0223373 | A1* | 9/2007 | Sato et al. ..................... 370/229 |
| 2009/0016222 | A1* | 1/2009 | Sebastian ...................... 370/236 |
| 2010/0149978 | A1* | 6/2010 | Johnson et al. ............... 370/232 |
| 2010/0149986 | A1* | 6/2010 | Johnson et al. ............. 370/235.1 |
| 2013/0258847 | A1* | 10/2013 | Zhang et al. .................. 370/232 |

* cited by examiner

*Primary Examiner* — Afshawn Towfighi
*Assistant Examiner* — Lakeram Jangbahadur

(57) ABSTRACT

Techniques for improving the performance of flow control mechanisms such as Pause are provided. The techniques provide for maintaining a fair distribution of available bandwidth while also allowing for fewer packet drops, and maximizing link utilization, in a distributed system. For example, in one embodiment, techniques are provided for achieving a fair share allocation of an egress port's bandwidth across a plurality of ingress ports contending for the same egress port.

23 Claims, 9 Drawing Sheets

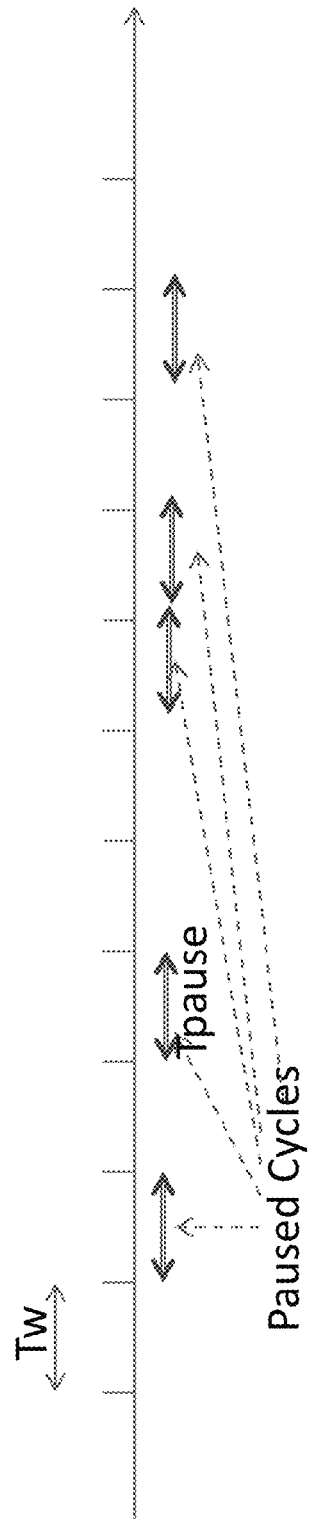

SMART PAUSE FOR DISTRIBUTED SWITCH FABRIC SYSTEM

TECHNICAL FIELD

The present disclosure relates generally to the field of flow control in computer networks, and in particular to techniques relating to Pause or similar flow control mechanisms for addressing network congestion.

BACKGROUND

Flow control mechanisms are used to prevent and reduce congestion in computer networks. Some flow control mechanisms operate by temporarily stopping transmission of data to congested nodes of a computer network until congestion at those nodes is reduced. One flow control mechanism of this kind developed for Ethernet networks, for example, is the Pause frame defined by the IEEE 802.3x standard. A congested node may send a Pause message to entities sending packets to it. The Pause message indicates that the sending source entities should temporarily suspend transmission of packets to that congested node. In one example, in response, source entities may stop transmission of packets to that congested node for a time duration specified in the Pause message.

Subsequently, Pause mechanisms were developed to provide for priority-based flow control. Such flow control mechanisms (for example, as defined in the IEEE 802.1Qbb standard) allow for finer-tuned use of Pause by distinguishing between flows of different Quality of Service (QoS) levels. In IEEE 802.1Qbb, for example, a priority-based Pause is implemented using Classes of Service (CoS).

Whatever the particular implementation, the goal of Pause messages (and other flow control mechanisms that direct source entities to temporarily stop transmitting packets to a congested node) is to reduce dropped packets, maximize link utilization, and/or prevent or alleviate congestion at network nodes.

While presently existing systems for implementing Pause and similar flow control mechanisms provide important benefits, they do not fully realize the potential of these flow control mechanisms. Various embodiments of the present application seek to improve upon and provide more sophisticated techniques for using such flow control mechanisms.

BRIEF DESCRIPTION OF THE FIGURES

The disclosure may best be understood by reference to the following description taken in conjunction with the accompanying drawings, which illustrate particular example embodiments.

FIG. 4B depicts an example time line showing the use of time intervals according to an embodiment of the present disclosure;

DESCRIPTION OF PARTICULAR EMBODIMENTS

Overview

Figure 1:
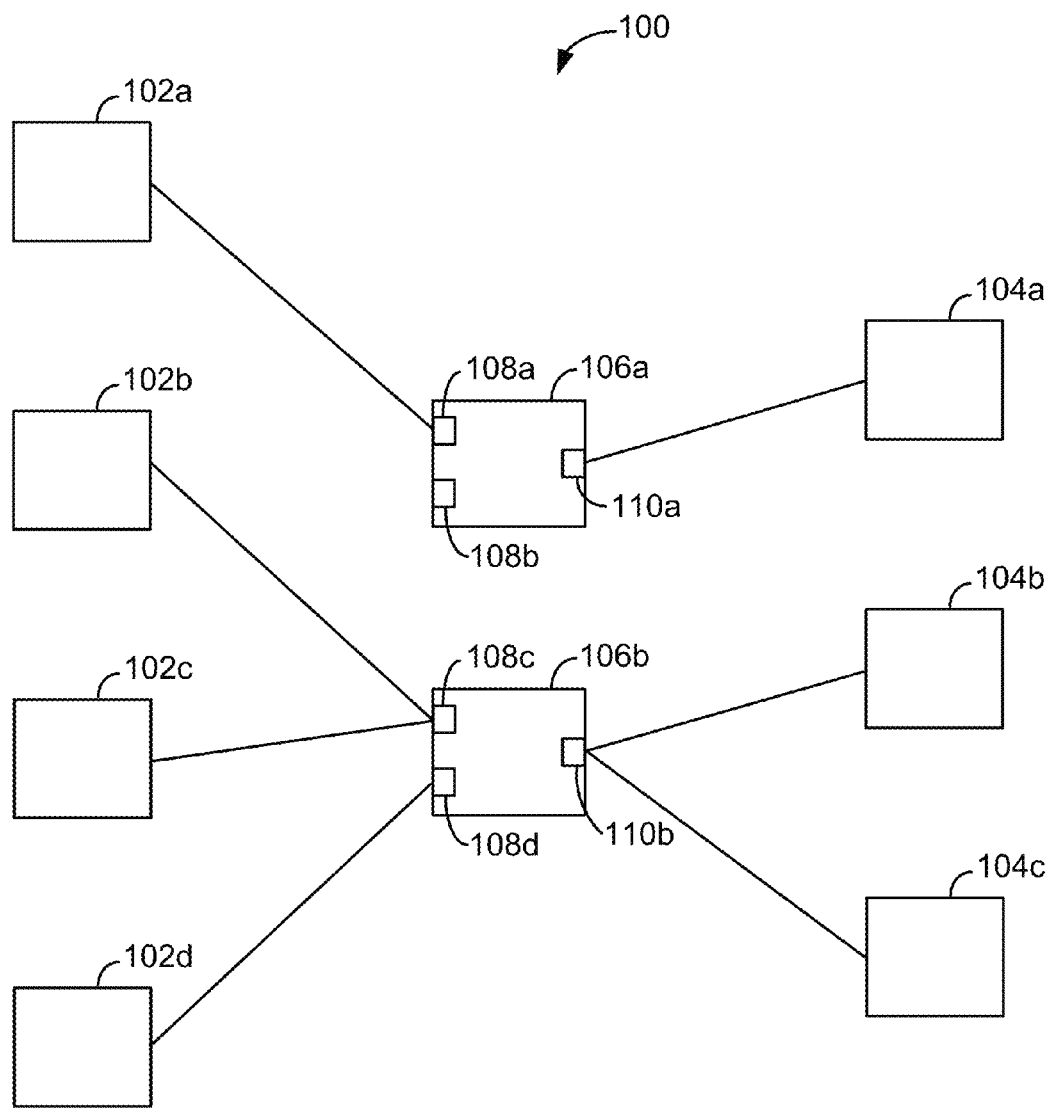
FIG. 1 is a simplified block diagram of an example computer network that may incorporate an embodiment of the present disclosure.

Techniques for improving use of flow control mechanisms such as Pause are provided. Among other things, techniques are provided for improving upon the use of Pause in the context of a network device having a distributed system of I/O buffer modules associated with ingress and egress ports. In such an embodiment, the techniques result in improved allocation of an egress port's bandwidth across a plurality of ingress ports of the network device, where the ingress ports are contending for the egress port's bandwidth. Automated techniques for intelligently determining when and from which ingress ports of a network device to issue Pause messages are provided.

According to an embodiment of the present application, at each of a plurality of I/O buffer modules, a target transmission rate for each of one or more associated ingress ports is calculated based on feedback information in congestion notification messages received from a first egress port. For each ingress port, the calculated target transmission rate of the ingress port is compared to a rate at which data for the first egress port is arriving at the ingress port. A determination of whether to send a Pause message from the ingress port is made based on the results of the comparison. According to an embodiment of the present application, the calculations are performed on a periodic and/or triggered basis. According to an embodiment of the present application, over time, the target transmission rate calculations performed for each of the plurality of ingress ports, converge towards a fair share allocation across the plurality of ingress ports of the first egress port's bandwidth. According to an embodiment of the present application, adjustments to bandwidth allocations are automatically made at runtime in response to changes in traffic flows.

The foregoing, together with other features, embodiments, and advantages of the present disclosure, will become more apparent when referring to the following specification, claims, and accompanying drawings.

Example Embodiments

In modern networks, a switch or other network device may include a plurality of hardware and/or software modules. For example, a plurality of I/O buffer modules may be used to implement I/O interfaces of a network node. A line card is an example of such an I/O buffer module. These I/O buffer modules may be located on different chips or integrated circuits. In alternative embodiments, one or more of these buffer modules may be located on the same chip or integrated circuit.

Each of the above described I/O buffer modules may be associated with a plurality of ingress or egress ports (or ports functioning as both ingress and egress ports). Additionally, each of the I/O buffer modules may maintain a plurality of actual or virtual queues, each queue corresponding, for example, to one of the associated ports. The ingress and egress modules may be interconnected by a switch fabric or other interconnection mechanism of the network device. Examples of such interconnection mechanisms are a switch fabric, a Stack Ring or a cross bar structure.

In a network device with a plurality of interconnected I/O buffer modules, generation of Pause frames to ingress ports in a way that all ingress ports contending to the same congested egress port achieve a fair weighted share of the egress port's bandwidth can be very challenging.

One challenge to implementing a Pause mechanism in such circumstances is figuring out a way to determine when and how to generate Pauses that takes account of traffic flows at ports of different I/O buffer modules.

Typically, in existing systems, the trigger for generating a Pause depends on a buffer occupancy level of an ingress queue exceeding a predetermined threshold. For example, in one existing mechanism, when buffer occupancy of a congested egress port of a network device is found to exceed a pre-determined threshold, a control signal is sent to all source ingress ports (i.e., all ingress ports sending to congested port), or a control signal is broadcasted to all ingress ports of the network device. In response, if those ingress ports have packets going to the congested buffer/port, they stop transmission of packets to that egress port. Further, if, their own ingress queues become filled up, and exceed a predetermined buffer occupancy threshold, the system sends Pause frames out of the associated ingress ports, until the congestion is cleared. There are other variations of this technique, but they all usually depend on checking to see whether buffer occupancy of a queue exceeds a predetermined threshold. The predetermined threshold does not change over time, and the comparisons are to buffer occupancy only. Under such systems, it is difficult to achieve fair share bandwidth allocations.

According to an embodiment of the present disclosure, a target rate for each of a plurality of ingress ports transmitting data to a first egress port is determined in a manner that achieves fair bandwidth allocation among ingress ports going to common egress ports, while avoiding buffer overflow/packet drop as well as under-link utilization at the egress ports across the plurality of ingress ports.

According to an embodiment of the present disclosure, calculations of the target transmission rates for each of the plurality of ingress ports contending to the first egress port are performed such that over time they converge to produce an allocation of target transmission rates for the ingress ports that approximates a fair share allocation of the first egress port's bandwidth.

The embodiments of the present invention described below are discussed in terms of techniques for determining when and how to send Pause messages from a network device. It should however be understood that, in addition to Pause messages, the teachings of the present invention may also be used in connection with other flow control mechanisms which have similar functionality. Further, it will be understood that the below described solutions for maintaining fair share across a plurality of I/O buffer modules could also be applied to fair share across different systems, for example, cooperation between egress and ingress points of a flow control domain. It is not necessary that the cooperating "modules" be I/O buffer modules that are part of a single network node in the manner described in various embodiments. The embodiments of the present invention described below are not meant to limit the scope of the present invention.

FIG. 1 is a simplified block diagram of an example computer network that may incorporate an embodiment of the present disclosure.

Computer network 100 comprises a plurality of network nodes 102, 104 and 106 coupled to one another via a plurality of communication links. As depicted in FIG. 1, computer network 100 includes user (client) systems 102 and server systems 104 coupled to each other through a plurality of network devices 106. Examples of network devices 106 are switches and routers. It will be understood that computer network 100 may include additional or different types of network nodes than those pictured in FIG. 1. Computer network 100 depicted in FIG. 1 is merely illustrative of an embodiment incorporating the present disclosure and does not limit the scope of the invention as recited in the claims. One of ordinary skill in the art would recognize other variations, modifications, and alternatives.

Computer network 100 may be comprised of many interconnected computer systems and communication links. For example, computer network 110 may be a LAN, a wide area network (WAN), a wireless network, an Intranet, a private network, a public network, a switched network, or any other suitable network, such as the Internet, or any other computer network.

According to an embodiment of the present invention, network devices 106 are configured to send Pause messages in the network environment depicted in FIG. 1. According to an embodiment of the present invention, network devices 106 are configured to perform processing to automate tasks relating to sending Pause messages in an efficient and fair manner. These tasks may include monitoring congestion conditions at a first egress port, calculating target transmission rates to the first egress port for a plurality of ingress ports contending to that first egress port's bandwidth, monitoring arrival rate of first egress port traffic at the plurality of ingress ports contending for the first egress port, and sending congestion notification messages from the first egress port to the plurality of contending ingress ports.

The processing may be performed by software modules executed by network devices 106, by hardware modules coupled to or contained within network devices 106, or combinations thereof. The hardware modules may consist of Application Specific Integrated Circuits configured as I/O line cards, for example. As noted above, the buffer modules may include one or more ingress and/or egress ports and may maintain ingress and egress buffers corresponding to those ports. The ingress or egress buffer module may be located on separate ASICs; or, in alternative embodiments, may be implemented on the same ASIC. Software modules associated with the ingress and egress hardware modules may perform calculations relating to use of Pause. The flow control formulas may be configured by a user (e.g., end-user, system administrator, manager, etc.) of the network environment. Details related to the calculations performed at the egress and ingress modules of network device 106 are provided below.

The network devices 106 depicted in FIG. 1 each have two ports 108 on their left side and one port 110 on their right side. It will be understood that the number of ports designated in FIG. 1 are used for illustrative purposes only. For purposes of discussion, it is assumed that all data in FIG. 1 is flowing in the direction left to right. Therefore, ports 108 on the left side will be described as ingress ports and ports 110 on the right side will be described as egress ports.

In FIG. 1, ingress port 108c of network device 106b receives data from two nodes—user (client) systems 102b and 102c. And it forwards that data to egress port 110b, which in turn transmits the data out of network device 106b to either server system 104b or server system 104c. Ingress port 108d of network device 106b by contrast receives data from only user (client) systems 102d. Ingress port 108d also forwards data it receives to egress port 110b.

Information used by ingress ports 108 and egress ports 110 to perform flow control according to the teachings of the present invention may be stored in a memory location accessible to the ingress or egress module which is performing the respective processing. It may, for example, be stored in a line card or other hardware module on which the ingress or egress module, respectively, is physically located. Each such hardware module may be associated with one or more ports, and may also maintain one or more actual or virtual queues. It should be understood that the information relating to those ports and queues might be stored in various formats known to those skilled in the art.

Figure 2:
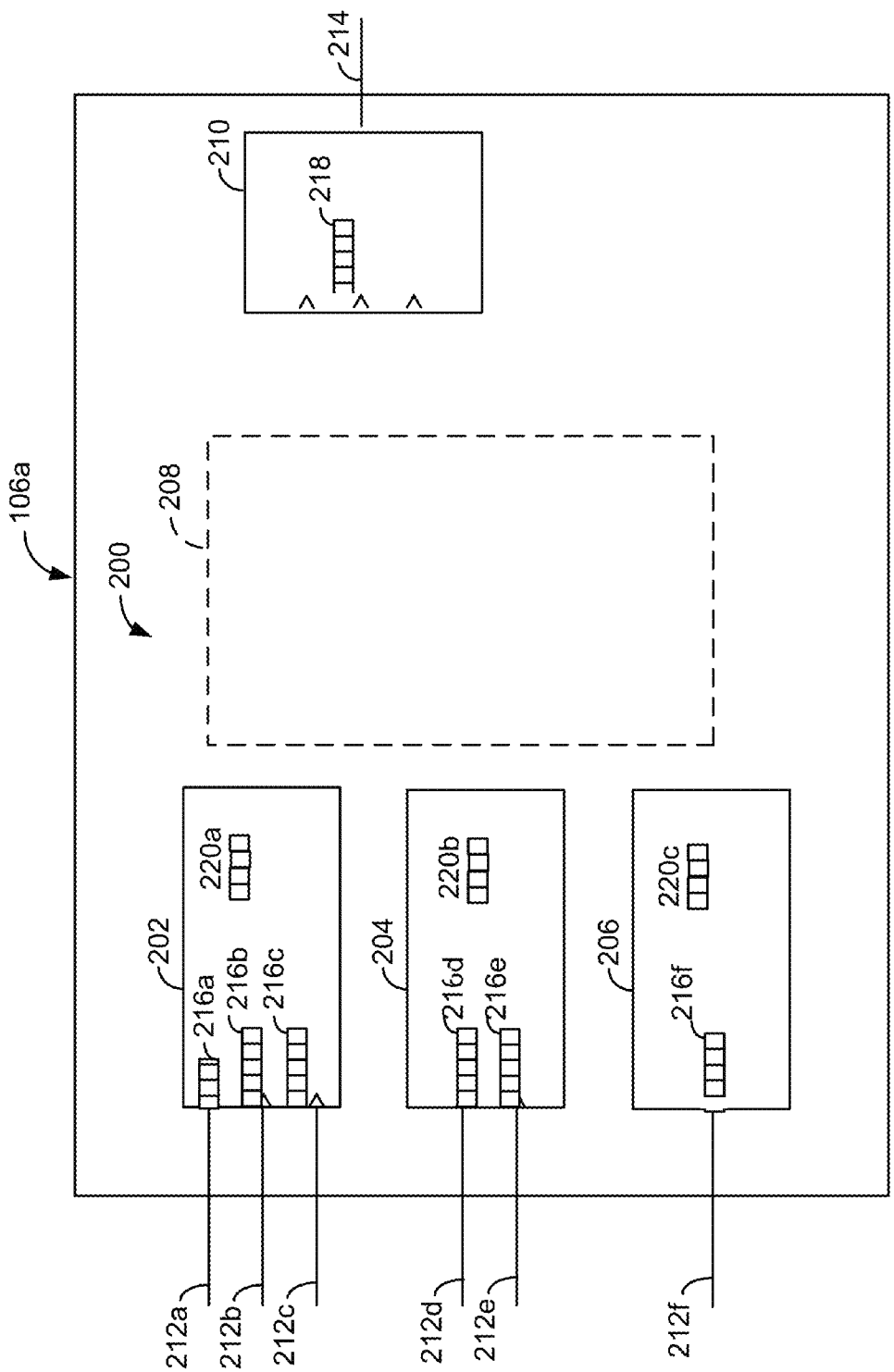
FIG. 2 is a simplified block diagram of an example network device, having a distributed switch fabric system, that may incorporate an embodiment of the present disclosure.

FIG. 2 is a simplified block diagram of an example network device 106b, having a distributed switch fabric system 200, which may incorporate an embodiment of the present disclosure.

In FIG. 2, a network device is shown having a distributed switch fabric system 200 which includes a plurality of ingress modules 202, 204 and 206 coupled to egress module 210 by an interconnection mechanism, such as switching fabric 208. Each of the ingress and egress modules 202, 204, 206 and 210 may be associated with one or more ingress and/or egress ports 212 and 214.

For example, ingress modules 202, 204 and 206 may be associated with one or more ingress ports 212, and may be connected over a switching fabric 208 to egress module 210. Egress module 210 may have an egress port 214. It will be understood that the number of ingress and egress modules and ports may vary in different embodiments.

Each of ingress modules 202, 204 and 206 and egress module 210 may maintain queues. It will be understood that these queues may be implemented in various ways. In one implementation shown in FIG. 2, the ingress buffer modules 202, 204 and 206 each have a fabric ingress queue 220. The ingress buffer modules 202, 204 and 204 maintain an accounting of the congestion notification messages received from egress port 214 for each of their associated ingress ports, as well as the arrival rate of data at their ingress ports, on a per ingress port basis. Elements 216 depict this per port accounting of the number of packets arriving at each of the respective ingress ports 212 and currently being held in ingress modules 202, 204 and 206. It will be understood that, in the implementation shown in FIG. 2, elements 216 correspond to the concept of accountings performed on a per port basis, and do not represent actual hardware components.

According to another embodiment of the present application (not depicted), these queues may be implemented as Virtual Output Queues (VOQs). A separate virtual output queue may be maintained for each possible combination of an ingress port 212 and egress port 214. For example, ingress module 202 may maintain three VOQs, each corresponding to a pairing of one of its ingress ports 212a, 212b and 212c, with egress port 214.

In another embodiment (not depicted), it will be understood that each of fabric ingress queues 220 may correspond to actual or virtual Class of Service queues. That is, a separate ingress queue, or a separate accounting, may be maintained for each possible combination of an ingress port, an egress port and a Class of Service (CoS) provided by a network device. For example, a computer network may provide users with the option of providing different quality of service levels to customer; these may be implemented using classes of service and can be useful in prioritizing among different packets in managing network congestion, and making decisions relating to shaping and policing network flows. The application of the inventive features of the present application to a system that provides Classes of Service will be appreciated by one of skill in the art.

As shown in FIG. 2, ingress module 202 has ingress ports 212a, 212b and 212c, and maintains accountings 216a, 216b and 216c for the flows associated with each of these ingress ports to egress port 214. Similarly, ingress module 204 has ingress ports 212d and 212e and maintains accountings 216d and 216e, corresponding to flows from each of its ingress ports to egress port 214.

Further, egress module 210 has an egress port queue 218, which holds packets until they are ready to be sent out of egress port 214.

According to an embodiment of the present disclosure, distribution of egress port 214's available bandwidth across ingress ports 212 is determined in a manner that achieves fairness and also efficiently reduces congestion at egress port 214.

For ease of description, only one egress port (egress port 214) is depicted in FIG. 2. It will be understood that, in practice, network device 106 will likely have multiple egress modules, each egress module associated with one or more egress ports, and each of the egress ports interacting with a plurality of ingress ports, in the same manner that egress port 214 is shown interacting with ingress ports 212a through 212f in FIG. 2. It will be appreciated that all of the tasks relating to implementing Pause described with respect to egress port 112 and its contending ingress ports, may be occurring at the same time with regard to other egress ports and their contending ingress ports. Further, a network device may be configured such that these tasks are performed simultaneously with respect to each such grouping of an egress port and its contending ingress ports.

Figure 3A:
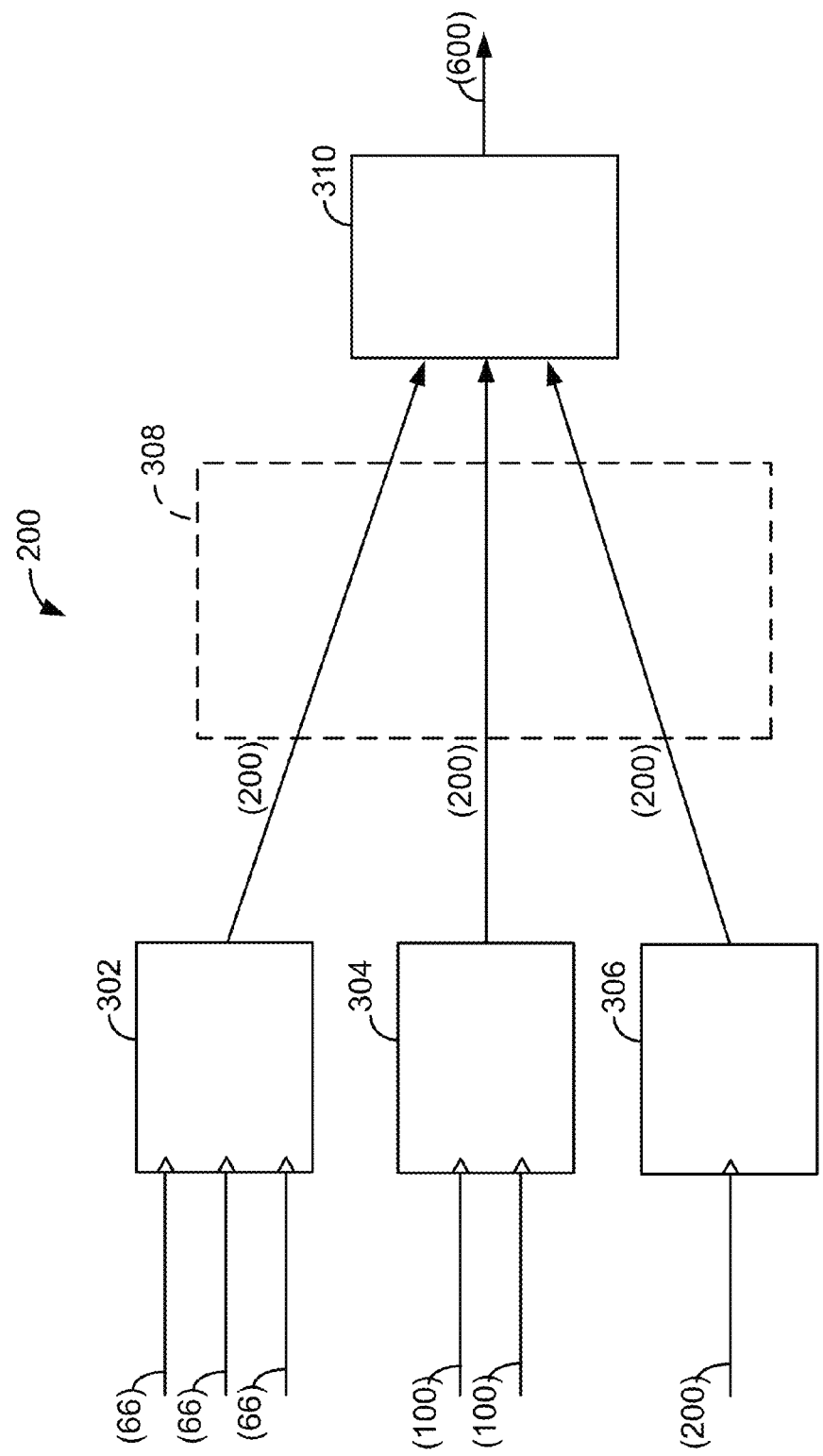
FIG. 3A is a simplified block diagram of an example network device, having a distributed switch fabric system, that may incorporate an embodiment of the present disclosure.

FIG. 3A is a simplified block diagram of an example network device 106b with a configuration similar to that of the network device depicted in FIG. 2. Network device 106b includes a distributed switch fabric 108 which interconnects ingress and egress buffer modules. For illustrative purposes, FIG. 3A shows a possible distribution of egress port 214's bandwidth across a plurality of ingress ports 212 of network device 106b. The bandwidth allocations are shown in parentheses to distinguish them from the element numbers used in FIG. 3A.

As depicted in FIG. 3A, egress port 214 has an available bandwidth of 600 units. Given the existence of six ingress ports (ports 112a through 112f), ideally, each of ingress ports 112 would receive 100 units of bandwidth as its allocation.

However, in some systems which perform bandwidth allocation, egress port 114's bandwidth is divided among ingress modules 102, 104 and 106 contending to egress port 114, regardless of the number of ingress ports 112 associated with those ingress modules contending for egress port 114's bandwidth. Under such a system, a bandwidth allocation of 200 units—⅓ of the egress port's bandwidth—may be provided to each of ingress modules 102, 104 and 106. According to such an embodiment, ingress port 112f of ingress module 106 may receive 200 units of bandwidth, while ingress ports 112d and 112e of ingress module 104 receive 100 units of bandwidth each, and ingress ports 112a, 112b and 112c of ingress module 102 receive 66 units of bandwidth each, of egress port 114's bandwidth. While this system achieves some fairness improvement, further improvement is desirable.

The above described system may unfairly penalize some ingress ports, causing them to be punished, for example, for an overload of the egress port caused by other ingress ports.

For example, consider a situation where ingress ports 112*d* and 112*e* of ingress module 104 have an arrival rate (that is. a rate of incoming packets to be sent out of egress port 114) that equals or is lower than their fair share (100 units) of egress port 114's available bandwidth. And the three ingress ports of ingress module 102 have an arrival rate that together is higher than egress port 114's total available capacity. In this situation, although module 102 is responsible for causing the congestion at egress port 114, not only may ingress module 102's transmissions to egress port 114 get suspended, but ingress module 104's transmissions to egress port 114, which should not be stopped under fair share, may also get suspended.

According to the teachings of the present disclosure, network device 106 is configured to provide an automated system for fairly allocating bandwidth among ingress ports contending to the same congested egress port in a distributed system comprising a plurality of I/O buffer modules. In an ideal fair share system, each of the ingress ports contending to an egress port's bandwidth would get an equal share of the egress port's bandwidth in the manner depicted in FIG. 3B.

Figure 3B:
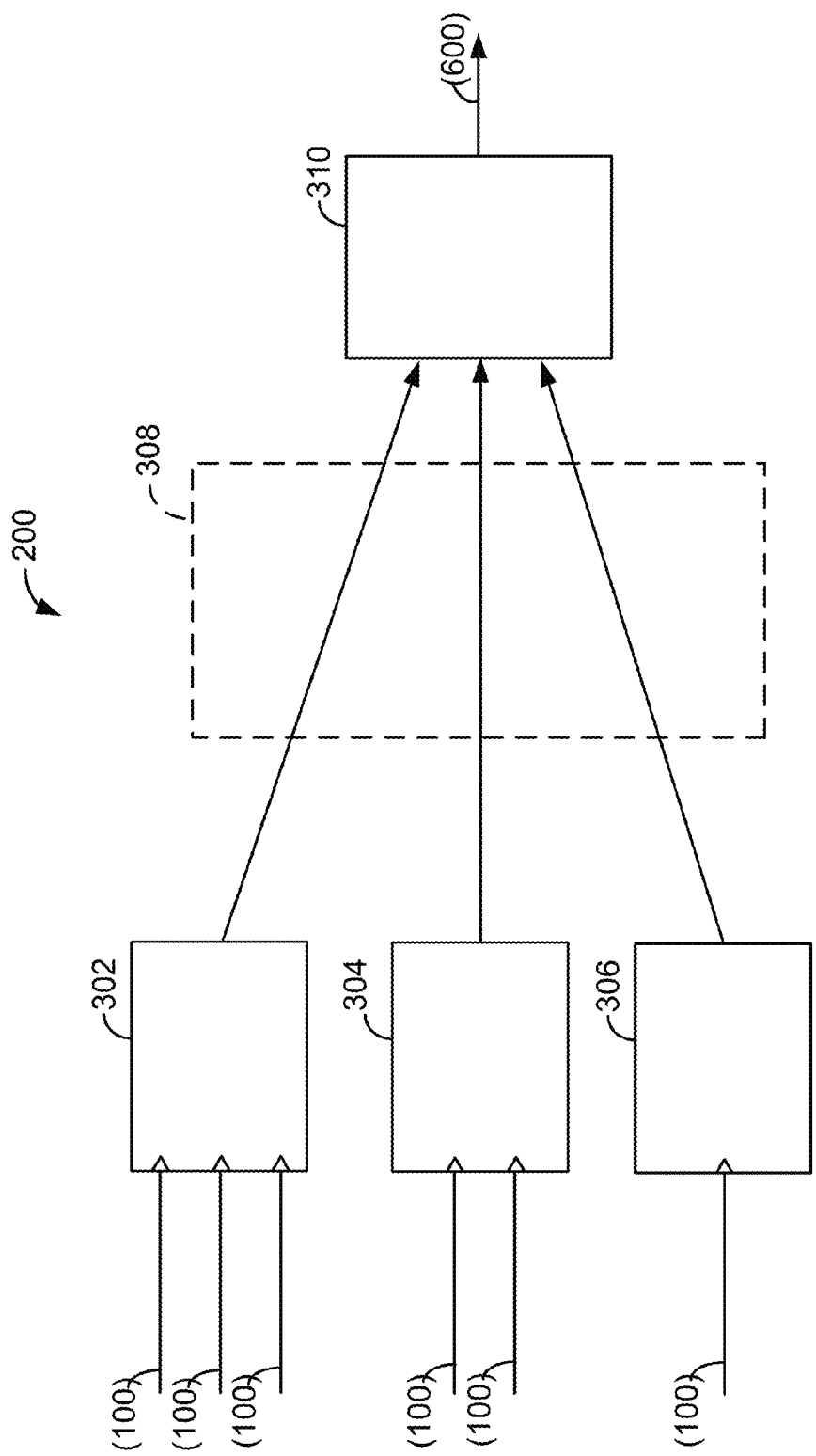
FIG. 3B is a simplified block diagram of an example network device, having a distributed switch fabric system, that may incorporate an embodiment of the present disclosure.

According to an embodiment of the present disclosure, Pauses to multiple ingress ports are generated based on egress buffer congestion degree such that the multiple ingress ports get fair share or weighted fair share of the egress port's bandwidth as shown in FIG. 3B.

According to an embodiment of the present disclosure, target transmission rates for each of a plurality of ingress ports contending for the bandwidth of a first egress port are determined in a manner that achieves fair bandwidth allocation among ingress ports going to common egress ports, while avoiding buffer overflow/packet drop as well as under-link utilization at the egress ports.

According to an embodiment of the present disclosure, the target transmission rates for the plurality of contending ingress ports sending data to the first egress port are determined based on calculations performed at each of the contending ingress ports on a periodic and/or, in some cases, triggered basis.

According to an embodiment of the present disclosure, at egress congestion points, egress modules send back feedback information (Fb) concerning a congestion degree of a congested egress port to ingress ports which are contending to the egress port.

According to an embodiment of the present disclosure, in order to reduce resource costs of making such calculations and to minimize the overhead for control traffic, monitoring of congestion at an egress port is only be conducted on a periodic basis. Packet sampling is conducted, for example, whenever an aggregate of 100 KB of data is received at the egress port. At a time sampling is conducted for an egress port, a feedback information value may be calculated for the egress port based on the present egress queue occupancy level.

According to an embodiment of the present disclosure, whenever a feedback message (Fb) is received by an ingress buffer module 102, 104 or 106, for an ingress port 112, the ingress buffer module recalculates the target transmission rate (Tr) of the ingress port based in part on the received feedback information. According to some embodiments of the present disclosure, the target transmission rate Tr is meant to estimate a fair share allocation for that ingress port of an egress port's bandwidth.

According to an embodiment of the present disclosure, an example of fair share computations for an ingress port occurs as follows: FairShare is decreased, whenever a congestion notification comprising congestion feedback degree Fb information is received for the ingress port.

For example: FairShare=FairShare−FairShare*Alpha*Fb (Alpha<1). Note that the calculation is based on the egress queue length/congestion degree feedback info (Fb) sent back from egress ports in a congestion notification message.

Further, according to an embodiment of the present disclosure, an ingress port's FairShare may be increased, if no congestion notification message is received in a time interval Tw. According to an embodiment of the present disclosure, if no congestion notification message is received during an interval Tw, a target transmission rate Tr for the ingress port is recomputed in a manner that increases that ingress port's FairShare. For example, FairShare might be computed for that ingress port by the following formula in that circumstance: FairShare=FairShare+FairShare*Beta (Beta<1).

According to an embodiment of the present disclosure, such Fairshare for a class_i can be weighted by computing Weight_class*FairShare.

According to an embodiment of the present disclosure, ingress reaction points (for example, ingress buffer modules) monitor arrival rate of packets at ingress ports, during time intervals with duration Tw, and if the amount of bytes received in a time interval Tw is larger than the presently computed Fairshare for that ingress port, a Pause with Pause Quanta Tq (that is, a duration of the requested stop transmission) is generated. In such an embodiment, resulting bandwidth for a source node might be calculated as follows: BW=Link Speed*(Tpause−Tq)/Tpause, where Tpause may be the time interval length (for example, in seconds) of the time window Tw used in making Pause determinations. According to an embodiment of the present disclosure, this concept may also be extended to implementations of Priority Pause (PFC).

According to an embodiment of the present disclosure, Pauses may be generated with a Pause Quanta Tq reflecting a length of time remaining in a time interval Tw when an aggregate arrival rate of data at an ingress port during a time window exceeds the ingress port's target transmission rate.

Figure 4A:
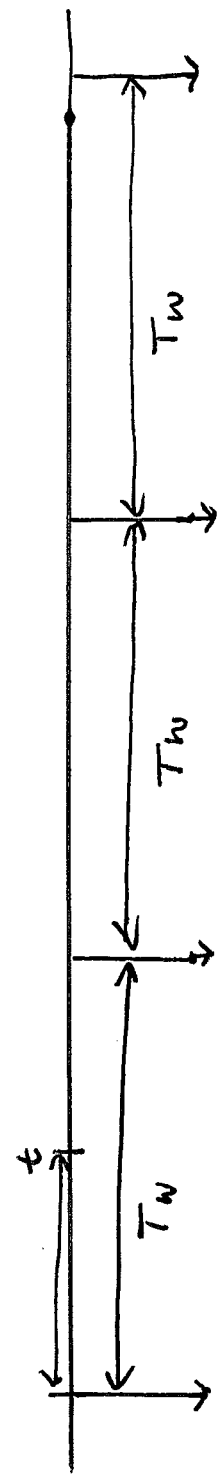
FIG. 4A depicts an example time line showing the use of time intervals according to an embodiment of the present disclosure.

FIG. 4A depicts an example time line showing the use of time intervals according to an embodiment of the present disclosure. Tw shows the time intervals used by various embodiments of the present disclosure to trigger recalculations of the target transmission rate for an ingress port. The parameter "t" indicates the point in time within a time interval Tw, when an arrival rate of incoming data equals or exceeds the target transmission rate presented calculated for the ingress port. The notation Pause (Tw−t) indicates that a Pause message may be generated at the ingress port, and the Pause message may indicate that transmissions to that ingress port should be stopped for the length of time Tw minus t.

According to other embodiments, a different Pause Quanta mechanism may be used. In such embodiments, for example, Pause messages may instruct source nodes to stop transmissions for a fixed pause length of Tpause. FIG. 4A depicts an example time line showing the use of a pause probability Pp and pauses that occur for fixed time interval Tpause according to an embodiment of the present disclosure.

The pause length Tpause may correspond to a time interval Tw used in implementing the target rate transmission calculations described above, or in other embodiments, the Tpause may be a shorter or longer time interval. A new variable pause probability Pp is introduced which corresponds to a probability that a Pause is required in a given time interval. The following is one formula which may be used to calculate pause probability Pp: Arrival*(1−Pp)=TargetRate. In other words, according to this formula:

$$Pp = 1 - \text{TargetRate}/\text{ArrivalRate}$$

Where the pause probability Pp exceeds a predetermined threshold (for example, zero), a Pause message having a fixed pause length of Ppause, as described above, may be generated.

According to an embodiment of the present disclosure, a feature of the invention is that over time the calculations performed at each reaction point, that is, at each individual ingress module to recalibrate its own target transmission rate results in a convergence to a desirable stable state where a fair allocation of, for example, an egress port 114's bandwidth across each of the ingress ports sending traffic to egress port 114 may be approximated or achieved. According to an embodiment of the present disclosure, no global calculations need to be performed to determine fair share allocations of bandwidth, but rather, through the above described distributed process, apportionment of bandwidth across, for example, a plurality of ingress ports that reflects a fair distribution of bandwidth is naturally achieved.

According to an embodiment of the present disclosure, the process by which the calculations performed at the egress and ingress ports converge to provide a fair allocation of bandwidth across multiple ingress ports is not a static process but one that dynamically responds to changes in network flows. For example, the process may dynamically respond to changes in the number of ingress ports sending packets to egress port 114 and the level of traffic sent by those ingress ports. It may also dynamically respond to changes in the amount of available bandwidth at an egress port. That is, according to an embodiment of the present disclosure, adjustments may be made dynamically at run time in response to changes in network traffic flow to achieve desirable allocation of egress port bandwidth across multiple ingress ports associated with multiple ingress buffer modules.

It will be understood that dynamic changes in an egress port's available bandwidth may occur, for example, where the egress port is a recipient of a Pause message from a next network node. Alternatively, for example, an egress port's available bandwidth may change if traffic is being regulated according to Quality of Service demarcations such as Classes of Service, and one of the classes of service is put into or out of active service.

According to an embodiment of the present disclosure, relatively small amounts of calculation are required, and even such calculation need only be performed on a periodic basis and/or in response to a specific trigger. For example, monitoring of congestion at an egress port, or checking whether a target transmission rate needs to be increased or decreased at an ingress port, need only occur on a periodic or triggered basis. In addition, an ingress port may adjust its target allocation downwards upon receipt of a congestion notification message with feedback information Fb from an egress port 114 indicating a congestion condition at that egress port.

According to an embodiment of the present disclosure, at the end of each time window Tw, a check is performed to see whether a congestion notification message for an ingress port was received during that time window Tw. If a congestion notification message was not received during that time window, the target transmission rate for that ingress port is increased using a formula for calculating an increase in the target transmission rate.

An arrival amount AB reflects an amount of aggregate traffic received at an ingress port during a particular time window Tw. According to an embodiment of the present disclosure, the arrival amount may be reset to zero at the start of each time window, so that it reflects only that traffic received during a single time window. In other embodiments, the arrival amount AB (i.e., amount of traffic which arrived) during a first time window may be carried over to some degree to a second time window. This feature is useful where a large amount of traffic is received during a first time window that an ingress port needs more than one time interval Tw to process, thus necessitating a longer Pause on incoming traffic. Carrying over an arrival rate from one time window to the next can facilitate providing a longer Pause. Thus, according to an embodiment of the present disclosure, at the start of each time window Tw, rather than the arrival bytes AB just being reset to zero; the AB is recalculated based on a formula that takes account of a holdover amount of AR (i.e., traffic that was received but was not fully processed in the last time window).

According to an embodiment of the present disclosure, calculations and enforcement of target fair share allocations are conducted on a distributed basis. Ingress modules determine an ingress port's target transmission rate and when to send Pause messages by themselves. There is no need for centralized management or control of bandwidth allocation. Further, the bandwidth allocation is performed in an automated manner.

According to an embodiment of the present disclosure, an assessment of congestion conditions at an egress port for purposes of determining feedback Fb information, takes into account not only the level of an egress queue's buffer occupancy, but also whether the buffer occupancy level has increased or decreased since the last time that egress queue's condition was assessed.

According to an embodiment of the present disclosure, the feedback information is computed for a packet received at a time that the aggregate byte threshold for sampling is reached, and feedback information is only sent back to the ingress port that is the source of the sampled packet rather than to all ingress ports contending to the egress port, for example.

Figure 5A:
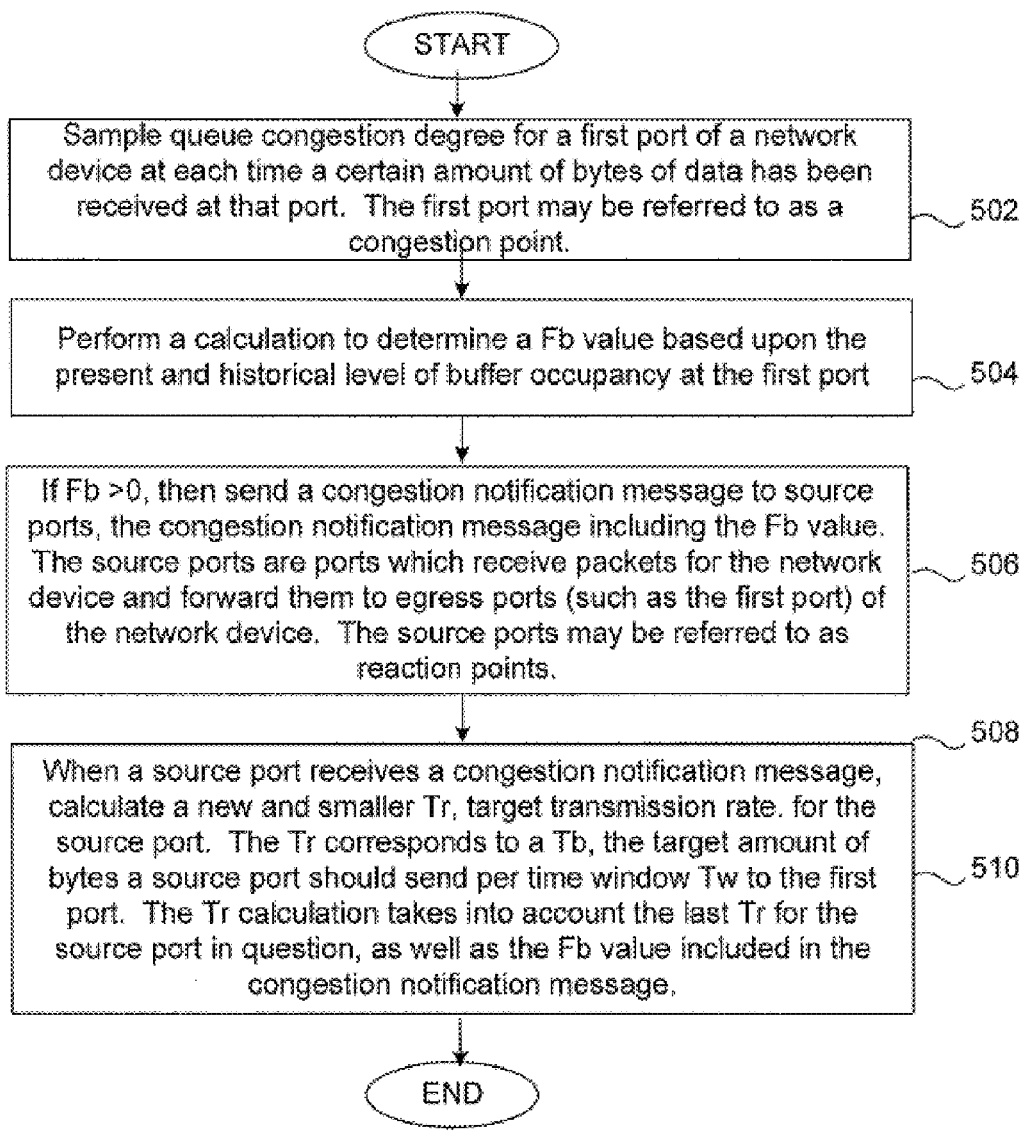
FIGS. 5a and 5b are simplified high-level flowcharts depicting different features of an example method according to an embodiment of the present disclosure.
Figure 5B:
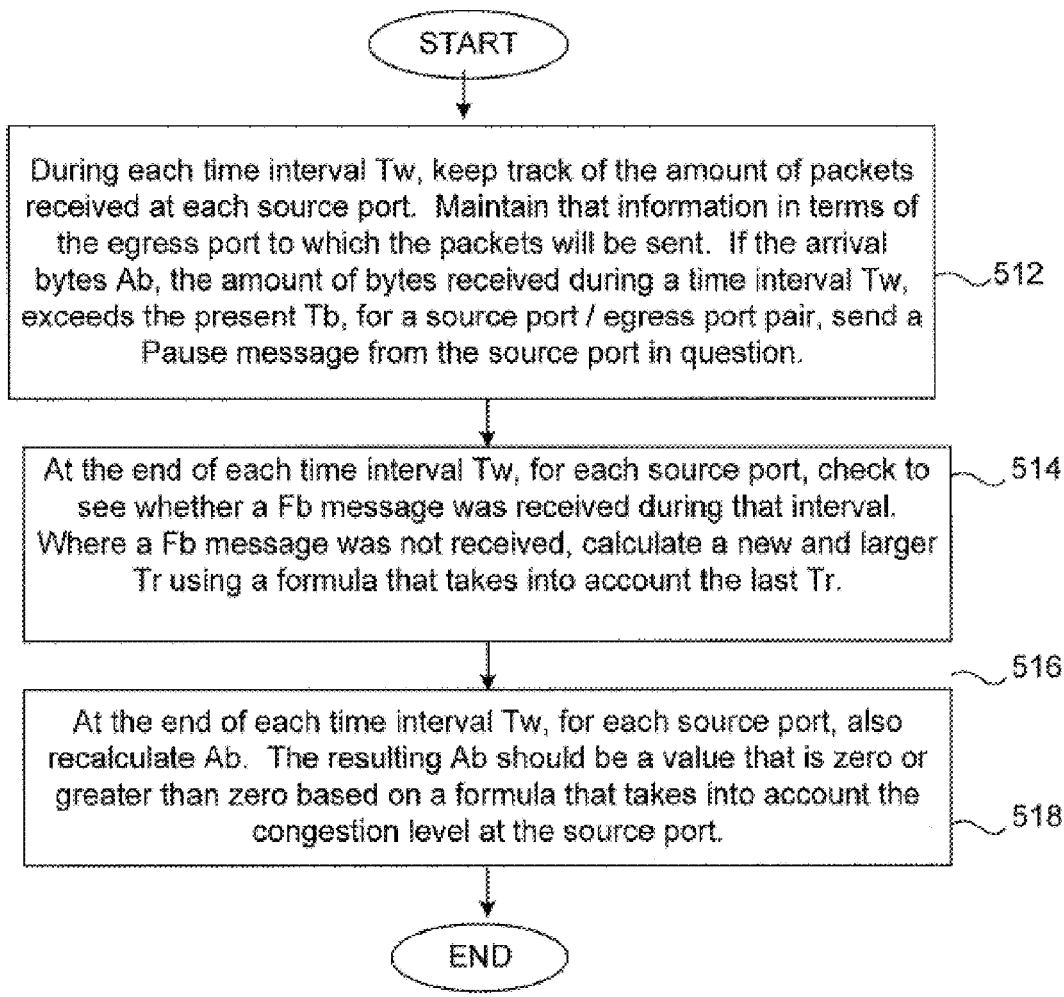

FIGS. 5a and 5b are simplified high-level flowcharts depicting different features of an example method according to an embodiment of the present disclosure. The features shown in FIGS. 5a and 5b overlap in some respects with the features of various embodiments of the present disclosure described above. It will be understood that various specific features of these described implementations may be varied without departing from the spirit of the present invention. Moreover, it will be understood that various features of different implementations described in this disclosure may be combined in another embodiment.

It will be understood that the formulas for performing the calculations at the congestion point (for the feedback Fb amount), and at the reaction points (for a new target transmission rate Tr), in the above described systems may be further refined from the embodiments set forth above. For example, the formulas may be refined, as described below, to provide additional advantages to a flow control system.

According to an embodiment of the present disclosure, the following calculations are performed at the congestion points (egress modules) and reactions points (ingress modules).

At the Congestion Point:

Provide a 1 bit feedback, Fb: 1 if qlen>qref

Take a sample at every 100 KB of data received at the egress port. Calculate whether qlen>qref. Send a congestion notification message to the source of the sampled packet if qlen>qref.

At the Reaction Point:

If a congestion notification message CN_ij (ingress port i, class j) is received, calculate a new target transmission rate TR using the formula TR_ij=TRij*Gd. Note that the decrease is based on the current target transmission rate TR multiplied by a constant.

If a congestion notification message CN_ij is not received for a particular ingress port during a time interval Tw, a new target transmission rate is calculated for that ingress port using the formula: TR_ij=TR_ij+increaseStep. Note that increases in transmission rates are triggered by an expiration of a time interval Tw without the receipt of any congestion notification messages CN.

If amount of arrival traffic AB in a time window is greater than TR_ij*Tw, a Pause frame is generated in order to achieve a fair bandwidth allocation among the ingress ports.

The below formulas further refine various inventive features.

At the Congestion Point, the feedback amount Fb may be calculated using the following formula.

$$Fb=(q\text{len}-q\text{ref})+w*(q\text{len}-q\text{old})$$

One sample is taken for every 100 KB of data received at an egress port. A congestion notification message is sent to a source of the sampled packet if Fb>0

At the Reaction Point:

If CN_ij (ingress port i, class j) is received for an ingress port, calculate a new target transmission rate for that ingress port using the following formula:

$$TR\_ij=TR\_ij-TR\_ij*Gd*Fb$$

Note that the decrease is based on the current rate

If CN_ij is not received for time interval Tw, instead calculate a new target transmission rate using the following formula:

$$TR\_ij=TR\_ij+TR\_ij*Gi+Ri$$

Note that the increase in TR is based on a set time interval elapsing without receipt of a congestion notification from the egress port.

Figure 6:
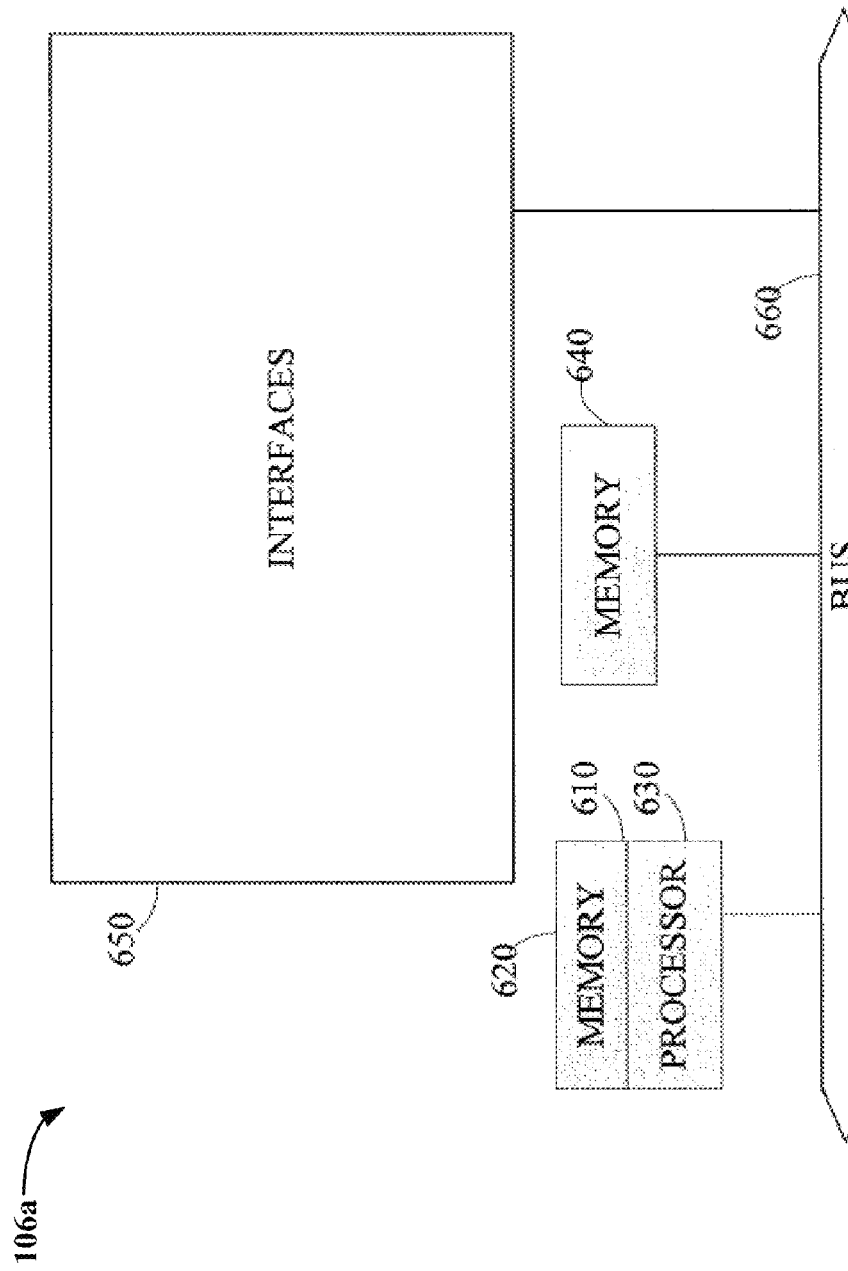
FIG. 6 is a simplified block diagram of an example network device suitable for implementing some embodiments of the present disclosure.

If arrival traffic at time $\tau$ ($0 \leq \tau \leq Tw$) in window Tw (in Bytes)>TR_ij*Tw, generate pause frame with a duration of Tw-$\tau$ So that a fair BW allocation among ingress ports may be achieved Tw is a bandwidth measurement time window As stated above, according to an embodiment of the present invention, network device 106 is configured to perform processing to send Pause messages in an intelligent manner according to the teachings of the present invention. FIG. 6 is a simplified block diagram of network device 106 according to an embodiment of the present invention.

Network device 600 includes a master central processing unit (CPU) 610, interfaces 650, and a bus 660 (for example, a PCI bus). When acting under the control of appropriate software or firmware, the CPU 610 is responsible for such tasks as switching and/or routing computations and network management. It preferably accomplishes all these functions under the control of software including an operating system (for example, the Internetwork Operating System (IOS®) of Cisco Systems, Inc.) and any appropriate applications software. CPU 610 may include one or more processors 630 such as a processor from the Motorola family of microprocessors or the MIPS family of microprocessors. In an alternative embodiment, processor 630 is specially designed hardware for controlling the operations of network device 600. In a specific embodiment, a memory 620 (such as non-volatile RAM and/or ROM) also forms part of CPU 610. However, there are many different ways in which memory could be coupled to the system. Memory block 610 may be used for a variety of purposes such as, for example, caching and/or storing data, programming instructions, etc.

The interfaces 650 are typically provided as interface cards (sometimes referred to as "line cards"). Generally, they control the sending and receiving of packets or packet segments over the network and sometimes support other peripherals used with the network device 600. Among the interfaces that may be provided are Ethernet interfaces, cable interfaces, DSL interfaces, and the like. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching and/or routing, media control and management. By providing separate processors for the communications intensive tasks, these interfaces allow the master microprocessor 610 to efficiently perform switching and/or routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as switching and/or routing computations, etc. is often used. Further, other types of interfaces and media could also be used with the network device.

Regardless of a network device's configuration, it may employ one or more memories or memory modules (such as, for example, memory block 640) configured to store data, program instructions for the general-purpose network operations and/or the inventive techniques described herein. The program instructions may control the operation of an operating system and/or one or more applications. The memory or memories may also be configured to store fair share values and parameters, burst thresholds, minimum and maximum thresholds, option selection bits, class parameters/specifications, timers, queue characteristics, packet arrival history parameters, etc.

Because such information and program instructions may be employed to implement the systems/methods described herein, the present disclosure relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store Examples of program instructions include both machine code, such as produced by a compiler, and files containing higher level code that may be executed by the computer using an interpreter.

While the disclosure has been particularly shown and described with reference to specific embodiments thereof, it will be understood by those skilled in the art that changes in the form and details of the disclosed embodiments may be made without departing from the spirit or scope of the disclosure. For example, embodiments of the present disclosure may be employed with a variety of network protocols and architectures. It is therefore intended that the disclosure be interpreted to include all variations and equivalents that fall within the true spirit and scope of the present disclosure.

What is claimed is:

1. A method comprising:
   at an ingress buffer module of a network device, calculating a target transmission rate for an ingress port associated with the ingress buffer module based on feedback information received from a first egress port for said network device, the feedback information indicating a congestion degree at the first egress port, wherein the ingress port is separate from the first egress port;
   comparing, at the ingress buffer module of the network device, the calculated target transmission rate of the ingress port to an arrival rate at which data is arriving at the ingress port for transmission by the first egress port;
   determining, at the ingress buffer module of the network device, whether to send a Pause message based on the results of the comparison,
   wherein the calculating, comparing, and determining are performed at each of a plurality of ingress buffer modules with respect to one or more associated ingress ports,
   wherein the ingress buffer module sends the Pause message for the first ingress port during a first time window Tw, the Pause message including a pause generation probability value which is obtained by a function of a computation involving the calculated target transmission rate for the first ingress port and the arrival rate at which data arrives at the first ingress port during said first time interval Tw.

2. The method of claim 1, further comprising
   calculating the target transmission rate of each of the plurality of ingress ports on one or more of a periodic or triggered basis.

3. The method of claim 1, wherein the calculations performed at each of the plurality of ingress buffer modules to determine the target transmission rates for each of the one or more ingress ports associated with said ingress buffer modules converge towards a fair share allocation of the first egress port's bandwidth across said ingress ports.

4. The method of claim 1, further comprising
   dynamically adjusting allocation of the first egress port's bandwidth across the ingress ports associated with the ingress buffer modules at runtime in response to changes in traffic flows to the ingress ports.

5. The method of claim 1, wherein improved allocation of the first egress port's bandwidth across the ingress ports associated with the plurality of ingress buffer modules is achieved via the target transmissions rate calculations performed by the ingress buffer modules, said ingress ports contending for the first egress port's bandwidth.

6. The method of claim 1, wherein a packet is sampled at the egress port when a predetermined aggregate amount of data has been received by the first egress port, and the sampling triggers a recalculation of a feedback amount Fb.

7. The method of claim 6, wherein the feedback information value Fb is transmitted to a first ingress port, the first ingress port being a source of the packet sampled at the first egress port at a time an aggregate sampling byte threshold for the first egress port is exceeded.

8. The method of claim 1, wherein an arrival byte amount AB is reset to zero or recalculated at the start of every time interval Tw, and the aggregate amount of the arrival byte amount AB during a time interval Tw is used by each of the plurality of ingress buffer modules in determining when to send Pause messages.

9. The method of claim 1, wherein, if the feedback amount Fb exceeds a predetermined threshold, a congestion notification message containing information about a feedback amount Fb is sent by the first egress port to the ingress ports of the plurality of ingress buffer modules contending for the first egress port's bandwidth, wherein the feedback amount Fb corresponds to a congestion degree at the first egress port.

10. The method of claim 1, wherein the target transmission rate of a first ingress port associated with one of the plurality of ingress buffer modules is decreased when a congestion notification message containing information about a feedback value Fb corresponding to a congestion degree at the first egress port is received for said first ingress port from the first egress port.

11. The method of claim 1, wherein the target transmission rate of a first ingress port associated with one of the plurality of ingress buffer modules is increased when a time interval Tw has elapsed without any congestion notification messages being received from the first egress port for said first ingress port.

12. The method of claim 1, wherein the Pause message is used to instruct source nodes to stop transmissions to a first ingress port for a specified time duration, the specified time duration approximating a length of a time window Tw minus a time t, the time t corresponding to a point during the time window Tw at which the arrival rate of date associated with the first egress port received at the first ingress port exceeds said first ingress port's calculated target transmission rate.

13. A system comprising,
   a plurality of network nodes;
   a plurality of network devices, the network devices interconnecting the network nodes;
   wherein each of the plurality of network devices are configured to:
   at an ingress buffer module of the network device, calculate a target transmission rate for an ingress port associated with the ingress buffer module based on feedback information received from a first egress port for said network device, the feedback information indicating a congestion degree at the first egress port, wherein the ingress port is separate from the first egress port;
   compare, at the ingress buffer module of the network device, the calculated target transmission rate of the ingress port to an arrival rate at which data is arriving at the ingress port for transmission by the first egress port;
   determine, at the ingress buffer module of the network device, whether to send a Pause message based on the results of the comparison,
   wherein the calculating, comparing, and determining are performed at each of a plurality of ingress buffer modules of the network device with respect to one or more associated ingress ports,
   wherein the ingress buffer module sends the Pause message for the first ingress port during a first time window Tw, the Pause message including a pause generation probability value which is obtained by a function of a computation involving the calculated target transmission rate for the first ingress port and the arrival rate at which data arrives at the first ingress port during said first time interval Tw.

14. An apparatus comprising,
   a plurality of ingress ports associated with ingress buffer modules;
   a plurality of egress ports associated with the egress buffer modules;
   a memory; and
   processors associated with the plurality of ingress buffer modules, the processors configured to:
   calculate a target transmission rate for an ingress port associated with the ingress buffer module based on feedback information received from a first egress port for the apparatus, the feedback information indicating a congestion degree at the first egress port, wherein the ingress port is separate from the first egress port;

compare the calculated target transmission rate of the ingress port to an arrival rate at which data is arriving at the ingress port for transmission by the first egress port;

determine whether to send a Pause message based on the results of the comparison, wherein the calculating, comparing, and determining are performed at each of a plurality of ingress buffer modules of the apparatus with respect to one or more associated ingress ports, wherein the ingress buffer module sends the Pause message for the first ingress port during a first time window Tw, the Pause message including a pause generation probability value which is obtained by a function of a computation involving the calculated target transmission rate for the first ingress port and the arrival rate at which data arrives at the first ingress port during said first time interval Tw.

15. The apparatus of claim 14, wherein the calculations performed at each of the plurality of ingress buffer modules to determine the target transmission rates for each of the one or more ingress ports associated with said ingress buffer modules converge towards a fair share allocation of the first egress port's bandwidth across said ingress ports.

16. The apparatus of claim 14, wherein improved allocation of the first egress port's bandwidth across the ingress ports associated with the plurality of ingress buffer modules is achieved via the target transmissions rate calculations performed by the ingress buffer modules, said ingress ports contending for the first egress port's bandwidth.

17. The apparatus of claim 14, wherein a packet is sampled at the egress port when a predetermined aggregate amount of data has been received by the first egress port, and the sampling triggers a recalculation of a feedback information value Fb.

18. The apparatus of claim 14, wherein the feedback amount Fb is transmitted to a first ingress port, the first ingress port being a source of the packet sampled at the first egress port at a time an aggregate sampling byte threshold for the first egress port is exceeded.

19. The apparatus of claim 14, wherein an arrival byte amount AB is reset to zero or recalculated at the start of every time interval Tw, and the aggregate amount of the arrival byte amount AB during a time interval Tw is used by each of the plurality of ingress buffer modules in determining when to send Pause messages.

20. The apparatus of claim 14, wherein, if the feedback amount Fb exceeds a predetermined threshold, a congestion notification message containing information about a feedback amount Fb is sent by the first egress port to the ingress ports of the plurality of ingress buffer modules contending for the first egress port's bandwidth, wherein the feedback amount Fb corresponds to a congestion degree at the first egress port.

21. The apparatus of claim 14, wherein the target transmission rate of a first ingress port associated with one of the plurality of ingress buffer modules is decreased when a congestion notification message containing information about a feedback value Fb corresponding to a congestion degree at the first egress port is received for said first ingress port from the first egress port.

22. The apparatus of claim 14, wherein the target transmission rate of a first ingress port associated with one of the plurality of ingress buffer modules is increased when a time interval Tw has elapsed without any congestion notification messages being received from the first egress port for said first ingress port.

23. The apparatus of claim 14, wherein the Pause message is used to instruct source nodes to stop transmissions to a first ingress port for a specified time duration, the specified time duration approximating a length of a time window Tw minus a time t, the time t corresponding to a point during the time window Tw at which the arrival rate of date associated with the first egress port received at the first ingress port exceeds said first ingress port's calculated target transmission rate.

* * * * *